United States Patent [19]
Petrasek et al.

[11] 3,946,782
[45] Mar. 30, 1976

[54] PNEUMATIC TIRE WITH LIGHT REFLECTIVE ELEMENTS

[75] Inventors: Stephen Edward Petrasek; Charles Steven Cooke, both of Akron, Ohio

[73] Assignee: The Firestone Tire & Rubber Company, Akron, Ohio

[22] Filed: Sept. 18, 1974

[21] Appl. No.: 507,098

[52] U.S. Cl............ 152/330 R; 350/99; 152/209 R
[51] Int. Cl.² .......................................... B60C 11/00
[58] Field of Search ...... 350/99, 102, 105; 152/209, 152/352, 353, 330 R, 330 L

[56] References Cited
UNITED STATES PATENTS

| | | |
|---|---|---|
| 1,455,306 | 5/1923 | Reilley et al. .......................... 350/99 |
| 3,247,880 | 4/1966 | Batori .............................. 152/209 R |
| 3,382,908 | 5/1968 | Palmquist et al. .................... 152/353 |
| 3,770,040 | 11/1973 | DeCicco ......................... 152/330 R |

*Primary Examiner*—Drayton E. Hoffman
*Assistant Examiner*—Larry H. Martin

[57] ABSTRACT

This disclosure relates to a vehicle tire which is provided with light reflective elements. These light reflective elements are so situated on the tire that they give certain, predetermined optical effects when the tire is being operated in certain speed ranges. These effects give the observer a clear optical warning that a vehicle is present and, moreover, an indication of the speed of the vehicle.

5 Claims, 4 Drawing Figures

PNEUMATIC TIRE WITH LIGHT REFLECTIVE ELEMENTS

BACKGROUND OF THE INVENTION AND PRIOR ART

This invention relates to tires and, more particularly, to tires containing reflective elements.

Reflective elements have been employed on the sidewalls of tires for two reasons. They have been employed to esthetically improve the appearance of the tire as a decorative piece. An example of this type disclosure in U.S. Pat. No. 3,253,634.

Reflective elements have also been placed on the sidewalls of tires as safety features. The reflective elements give an observer warning of the existence of the vehicle at night time by reflecting back the light originating from the observer's vehicle or another source. An example of this type disclosure in U.S. Pat. No. 3,382,908. Most recently, this principle has been applied to the sidewalls of bicycle tires. In this recent application the bicycle tires are provided with annular bands of reflective tape, located on the lateral portion of the sidewall in a position similar to the white sidewall on an automobile tire.

This invention deals with the second of the above-disclosed uses. It will be noted that the use of the reflective element as a safety feature has only been disclosed as being located on the laterally visible portion of the sidewall so that the reflection occurs from light directed at the tire from a direction perpendicular to the circumferential plane of the tire. More importantly, this prior use has not disclosed any feature by which the relative speed of the tire, and accordingly, the vehicle carrying the tire, can be determined.

It is an object of this invention to provide the tire with a reflective surface that can reflect light which strikes the tire in a direction parallel to the circumferential plane of the tire; that is, light directed at right angles to the tread surface or the road-engaging surface of the tire.

It is a further object of this invention to place these reflective elements in the tire so that the relative speed of the tire may be determined by the optic response that the reflective elements provide. That is, it is an object of this invention to so locate the reflective elements on the tire that the observer can tell from the reflections therefrom the specific speed range in which the tire is rotating. Ideally, the observer will be able to determine if the tire is running at a slow or fast speed and, more specifically, whether the tire is running at speeds of 10 or 20 mile per hour increments.

The tire of this invention provides safe tires which includes elements which will enable an observer to determine the speed at which the tire is rotating during the night hours.

SUMMARY OF THE INVENTION

The tire construction that is the subject of this invention can be incorporated in any size or type tire; that is, bicycle, motorcycle, passenger, racing, truck, off-the-road, tractor or farm implement tires. The invention provides the tire with reflective elements which will reflect back light which falls upon these elements during the night season. This reflection gives an observer the knowledge that there is a wheeled vehicle which he is approaching. The specific novelty of this invention resides in the fact that these reflective elements are so located on the tire that they provide the observer with an indication of the speed at which the tire is being rotated. This knowledge enables the observer to quickly determine whether he need take safety measures to compensate for the relative speed of the vehicle he is approaching in relationship to the speed of his own vehicle. This safety feature is particularly important when considering slow moving vehicles, such as farm wagons or equipment, on unlighted roads in the night season. This invention is also helpful with bicycles and other such slow moving vehicles but is not limited to vehicles of this type and may be employed on any wheeled vehicle.

The reflective elements which are placed on the tires are the elements of the type disclosed in U.S. Pat. No. 3,382,908. These elements are of the reflex - reflective type and comprise aggregates consisting of transparent glass beads bonded around a rigid core with minute light reflecting layers under the beads. This type of material is disclosed in U.S. Pat. No. 3,043,196.

These reflective elements may be located in the grooves of the tread design of the road-engaging tread surface of the tire where the design permits or may be located in a depression on the road-engaging tread surface. It is, of course, essential that these elements be located on a portion of the tire which will not be in contact with the road surface so that the elements will not be worn away during the service life of the tire.

The elements may also be located on a piece of the tire that is projected axially outwardly from the tire sidewall surface. In this later location, the elements must be so located that they reflect light which is directed on the road-engaging surface of the tire and must be visible to an observer located either in front of or behind the vehicle.

The novelty in this invention resides in the feature that the reflective elements are so placed on the tire that they provide the observer with an indication of the speed at which the tire is rotating. This indication may be achieved by locating the reflective elements so that the observer receives a different optical response from certain areas of the tire at different predetermined speed ranges. This may be accomplished by providing the tire with several series of reflective elements with each such series located in one circumferential plane of the tire. Depending upon the size and frequency of these elements in relation to the overall circumference of the tire, different optical effects may be obtained at different speeds.

For example, each of these circumferential planes may contain different numbers of the reflective elements at different spacings. This results in the tire giving different optical responses at different speeds. At one speed some of the circumferential planes would give intermittent flashing or pulsating phenomenon, others would give solid stationary points and others solid vertical lines.

The size, number and spacing between each element is very important in order to obtain the proper optical response. The elements must be of a sufficient intensity to give the optical warning at a sufficient distance so the operator may have time to make any necessary adjustments in speed or direction. However, if the intensity is too great, the pulsating response may be lost due to a "tracer" effect which occurs. This tracer effect may be so great that it will result in an optical response like a solid line instead of pulsations.

It is envisioned that a national standard could be established whereby every observer would know the speeds at which certain optical responses would occur so that the public would be able to determine the speed of vehicles as the vehicles were approached in the night season. The safety feature of this type of invention is obvious.

The second type of optical response is a sine wave or wavy type of optical phenomenon. This type of response is provided by placing the reflective means in different circumferential planes of the tire. These elements are all located on the path of a sine wave whose length is equal to the circumference of the tire. For example, the left-hand groove has one element placed at a peak of the sine wave, the next groove has two elements equally spaced on either side of the first element so that they fall on the path of the sine wave, the next groove has two more elements spaced so that they fall on the path of the sine wave equidistant from the second two elements and circumferentially farther from the first element and the fourth groove has one element spaced so that it is located at the other peak of the sine wave, 180° from the first element. In this manner, a wavy optical response is accomplished. The relative speed of the tire may be determined by the frequency of this wavy response. This type of construction is not as readily adaptable to give the observer a quick indication of the general speed of the tire as is the former configuration, but it is more readily adaptable to a practical system of relative speed indication.

Both of these optical responses are of the type which provide a changing pattern so that they will be readily discernible to an observer and will, in fact, attract the observer's attention.

DETAILED DESCRIPTION OF THE INVENTION

The reflective elements may be located in any area of the tire that is visible to an observer that is standing either in front of or behind the vehicle upon which the tire is mounted. This surface is preferably a depression in the road-engaging surface of the tire but may be on the side of a protrusion on the sidewall of the tire. The depression in the road-engaging tread surface may be the base of a tread groove in the standard rib - groove type tread design or it may be a depression specifically molded into the tire to facilitate the inclusion of the reflective elements.

These reflective elements are preferably molded into the tire during the vulcanizing or curing operation. The elements may be placed on the external surface of the green tire in the proper locations prior to placing the tire in the tire mold. Great care must be taken in this method so that the reflective elements are properly located on the external surface of the green tire to correspond with the desired locations in the molded, cured product; that is, they must be located in the depressed portions of the cured product so that they are not worn off during use.

Alternatively, the reflective elements may be placed on the protrusion of the mold itself. These protrusions, of course, result in the depressions in the finished product. The reflective elements will be transferred to and vulcanized to the finished product during the curing operation.

Possibly, the elements may also be cemented onto the finished tire after it has been molded. In this manner, this invention may be applied to a tire that has already been manufactured.

Figure 1:
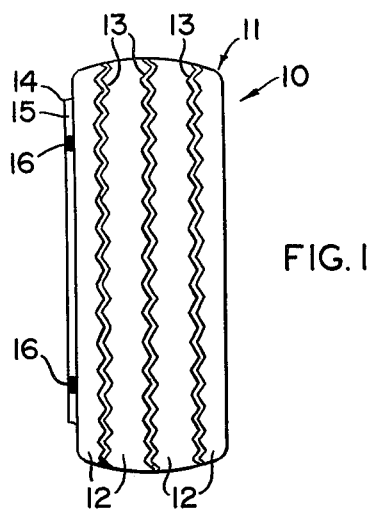
FIG. 1 is a front view showing one-half of a tire containing one embodiment of this invention.

Referring to FIG. 1, tire, 10, is shown as having its road-engaging tread surface, 11, containing four circumferentially extending tread ribs, 12, which define three circumferentially extending tread grooves, 13. These grooves are depicted as having a zig-zag pattern but may have any pattern. It is also understood that these grooves and ribs may be interrupted and need not be circumferentially continuous.

Tire, 10, is provided with a sidewall protrusion, 14, which is in the form of a continuous annular member extending axially outwardly from the sidewall. It is understood that the sidewall protrusion may have configurations other than an annular member. It is only necessary that the protrusion have a radially outwardly facing side which can form the base for mounting the reflective elements. It is further understood that both sidewalls of the tire may be equipped with sidewall protrusions and that such protrusions can differ in their configurations in the same tire.

The radially outwardly facing side, 15, of sidewall protrusion, 14, contains two, one inch long reflective elements, 16. The other half of the tire, not shown, contains two similar elements with the four elements spaced equidistant from each other. It is understood that the number of elements will be varied depending upon the size of the tire and the speed at which the certain optic effects are desired.

Figure 2:
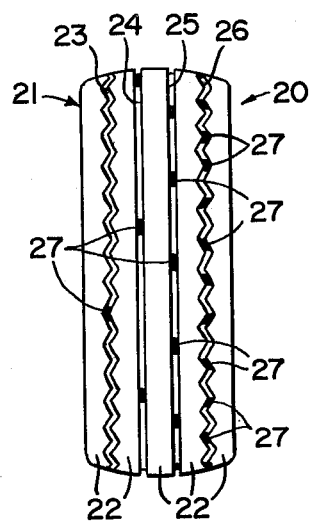
FIGS. 2 and 3 are front views showing one-half of a tire containing other embodiments of this invention.
Figure 3:
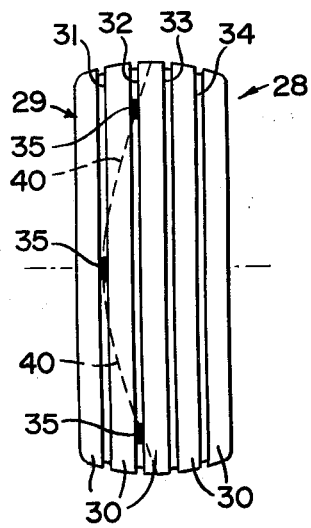

FIG. 1 depicts the tire of this invention with one circumferential plane containing reflective elements. It is understood that the invention is not limited to the number of circumferential planes having reflective elements. It is contemplated that more than one circumferential plane of the tire will contain reflective elements and that the number of such elements can either be identical in some of the planes or can vary from plane to plane. FIGS. 2 and 3 are examples of the embodiments of this invention wherein the tire contains several circumferential planes having different numbers of reflective elements.

Referring to FIG. 2, tire, 20, is shown as having its road-engaging tread surface, 21, contain five circumferential ribs, 22, which define four circumferential grooves, 23, 24, 25 and 26. In this embodiment grooves 24 and 25 are shown as having a straight pattern, whereas grooves 23 and 26 are shown as having a zig-zag pattern.

Reflective elements, 27, are located in each of the grooves. In FIG. 2 the grooves 23, 24, 25 and 26 are shown as containing three, six, 12 and 24 elements, respectively, with each element spaced equidistant from the other elements in the same groove. FIG. 2, being a front view showing one-half of the tread surface of the tire, shows one element, 27, in groove 23; it is understood that this groove contains two other elements. Three elements are shown in groove 24; it is understood that three other such element are located in the other half of the groove. Six elements are shown in groove 25; it is understood that six similar elements are located in the remaining one-half of the groove. Twelve elements are shown in groove 26; it is understood that twelve other elements are located in the remaining one-half of the groove. As a result of varying the number of reflective elements in each groove, each groove would give a different optical response to the observer at different speeds.

The embodiment shown and described in FIG. 2 has been tested by the Applicant. In this embodiment, a farm implement tire having a 96 inch tread circumference and four tread grooves was provided with strips of reflective tape one inch long. The left-hand groove was provided with three such strips, the next groove with six, the next groove with 12 and the right-hand groove with 24. These strips were placed equidistant from each other around the circumference of the tire; that is, the groove which contains three strips had the strips placed 120° from each other, the groove which contained six strips had the strips placed 60° from each other, the groove which contained twelve strips had the strips placed 30° from each other and the groove which contained 24 strips had the strips placed 15° from each other. The placement of these strips is important. These particular strips were designed to give a pulsating or flashing optical response at certain speed ranges. Specifically, the groove having three strips gives a flashing response at about 40 miles an hour and below and a vertical line above 40. The groove with six strips gives a flashing response at about 20 miles an hour and below and a vertical line above 20. The groove with 12 strips gives a flashing response at about 10 miles an hour and below, and a vertical line above 10. The groove with 24 strips gives a flashing response at about 5 miles an hour and below and a vertical line above 5. Therefore, with the tire being operated at 35 miles an hour the observer would see a flashing or pulsating response and three vertical lines, at 20 miles an hour the observer would see two flashing responses and two vertical lines, at 10 miles an hour the observer would see three flashing responses and one vertical line and at 5 miles an hour the observer would see four flashing responses. The location and size of these strips were predetermined per the mathematical calculations which follow:

The Applicants are able to design the tire of this invention to give predetermined optical effects at predetermined speeds regardless of the size of the tire. The Applicants are able to accomplish this by determining the linear inches of the tire's surface which the observer will be exposed to at a given speed. The Applicant accomplishes this by taking into consideration the length of the circumference of the tire and the number of revolutions made by the tire at certain speeds. After determining this factor, the Applicants taking into consideration the number of events which the human eye can detect to perceive motion, can determine the length in inches of each such event on the circumference of a tire when it is travelling at a predetermined speed. The Applicants then know how many reflective elements must be porvided in a circumferential plane on the selected tire to give the desired optical result at the given speed.

As an example, 1 mile per hour is the equivalent of 17.6 inches per second. In a farm implement tire having the size designation 11L-15, having a circumference of 96 inches, 24 equally spaced 1 inch elements would result in a unit spacing of 4 inches between comparable portions of the 1 inch elements. Therefore, at one mile an hour, 4.4 such units would be observed each second (17.6 inches per second per mile per hour divided by 4 inches per unit equals 4.4 units per second per mile per hour). Given the fact that the human eye is capable of recognizing up to 25 events per second, at 5.68 miles per hour the observer would see a solid, reflective light (25 units per second divided by 4.4 units per second per mile per hour equals 5.68 miles per hour).

If the remaining three grooves in a tire having four grooves, as depicted in FIG. 2, contain 12, 6 and 3 equally spaced 1 inch elements, the speeds at which a solid reflective light would be observed from these grooves would be 11.36, 22.72 and 45.44 miles per hour, respectively.

This type of calculation may be applied to any tire regardless of its circumference to determine the number of units, and thereby the number of reflective elements necessary to give a solid, reflective light at a predetermined speed and a flashing light at other speeds. This generic equation may be set out as follows:

$$\frac{\text{Tire Circumference (IN.)}}{17.6 \text{ in./sec.-mph}} \times \frac{25 \text{ Units}}{\text{Sec.}} \times \frac{1}{\text{No. Units}} = \text{MPH}$$

This equation may be simplified to give the following equation:

$$\frac{\text{Tire Circumference (In.)} \times 1.42 \text{ Unit-MPH/In.}}{\text{Speed (MPH)}} = \text{NO. UNITS}$$

This equation gives the number of units which should be placed at equal intervals on the tread surface. The spacing of the units on the tire is obtained by merely dividing the tire circumference by the number of units.

Having thus determined the number of units, and thereby the number of reflective elements, the size of the reflective element is related to the linear size of the unit. The Applicants have found that, in order to obtain a proper contrast, the reflective element in the unit should not be greater than one-half of the linear length of the unit. As an example, if the unit is determined to be 4.4 inches, the length of the reflective element should be no greater than 2.2 inches, in this example, the Applicant has found that a length of one inch for the reflective element gives very satisfactory contrast and an excellent optical response.

Using the equation set out above, the Applicants can determine the number of reflective elements necessary for a certain size of the tire to give a predetermined optical response at certain speeds. Applying this principle, the Applicant can provide a tire with circumferential planes, each plane having a different number of reflective elements. In this manner, each of the circumferential planes will give a different optical response at a predetermined speed. These different responses may vary between a solid, reflective point to a flashing or pulsating light or a solid vertical line.

Using these equations, the Applicants determined that the placement of the elements described above in relation to FIG. 2 would give a solid response above a certain speed and a flashing response at or below the certain speed. In actual practice, these flashing responses are somewhat masked by the "tracer" effect but are definitely present. The tracer effect causes the flashing to be somewhat smeared but a true pulsating light is still evident.

FIG. 3 shows yet another embodiment of this invention. In this embodiment, tire, 28, is shown having a tread surface 29, with five ribs, 30, which define four grooves, 31, 32, 33 and 34, respectively. The reflective elements, 35, all fall on a sine wave whose length is equal to the circumference of the tire. In the example, the sine wave path is shown as dashed line 40. Groove 31 contains one element, 35, which is located at a peak of the sine wave. Groove 32 contains two elements, 35, which are equally spaced from element 35 in groove 31 and fall on the sine wave path. Groove 33 contains two more elements, 35 not shown in FIG. 3 but see FIG. 4, equally spaced from the corresponding elements, 35, in groove 32 and located on the sine wave path. Groove 34 would contain one element, not shown in FIG. 3 but see FIG. 4, which would be located at the other peak of the sine wave, 180° from element 35 in groove 31.

Figure 4:
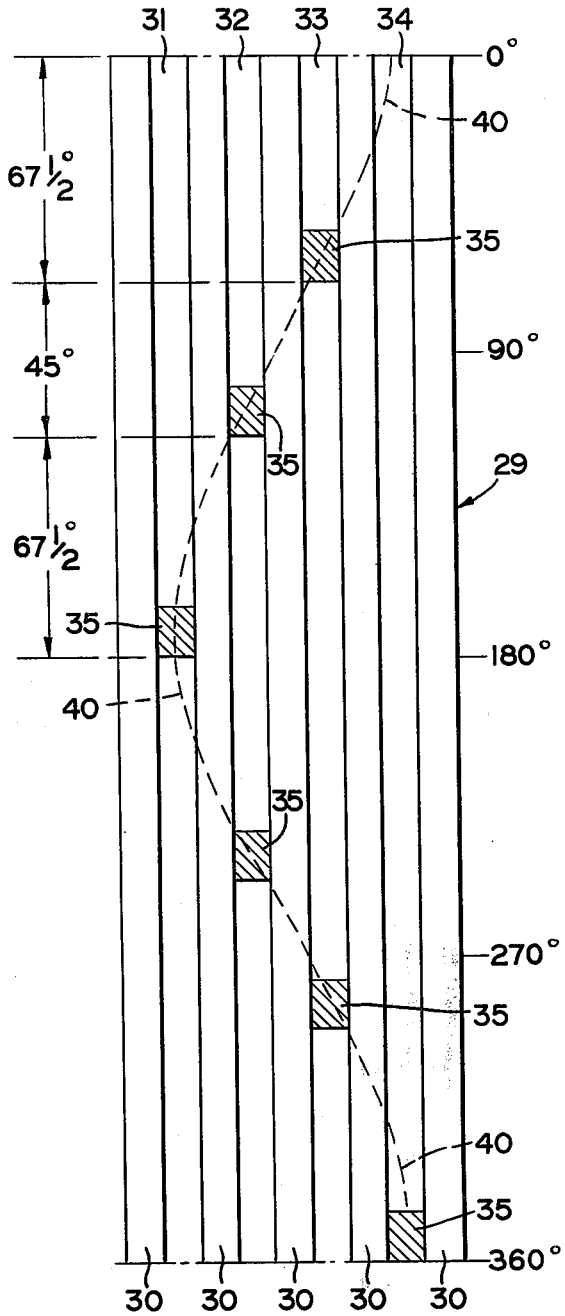
FIG. 4 is a plan view of the tread surface of FIG. 3.

FIG. 4 is a plan view of the total circumference of the tread, 29, in FIG. 3. FIG. 4 shows all of the elements at their locations on the sine wave path, 40. Elements 35 in groove 32 are 67.5° from element 35 in groove 31; elements 35 in groove 33 are 45° from elements 35 in groove 32 and element 35 in groove 34 is 180° from element 35 in groove 31 or is 67.5° from elements 35 in groove 33.

This example has been manufactured and tested by the Applicants. Again, the tire so tested had a 96 inch circumference. This embodiment contained six one inch long elements with one element located in the left-hand groove and each of the other grooves having two such elements. The elements in each of the grooves were spaced equidistant from the closest element in the adjacent groove; in this example the distance was 10.3 inches. The tire described above gave a wavy, pulsating light reflection at different speeds. The frequency of the wavy nature of the optical response from this tire increased as the speed of the tire increased. Also, the four circumferential planes containing the reflective elements in this embodiment gave a solid line optical response at certain speeds and a flashing or pulsating response at other speeds.

It is understood that the location of the reflective elements on the tire as shown in FIGS. 1 and 2 or FIGS. 1 and 3 may be combined so that the grooves in tire 10 in FIG. 1 may also contain reflective elements on the sidewalls of the tires, 20 and 28, in FIGS. 2 and 3 may also contain protrusions which support reflective elements.

The reflective elements acceptable for this invention comprise any material which will reflect light when exposed to it. The Applicants have found that a reflective tape manufactured by the Minnesota Mining and Manufacturing Company and identified by the company as Scotch Lite Brand Reflective Tire Sheeting No. 401 is particularly suited for application in this invention. This reflective tape is comprised of minute glass beads mounted on a binder.

We claim:

1. A vehicle tire comprising a plurality of light reflective elements located on the periphery of said tire to reflect light in a direction perpendicular to the axis of rotation of said tire having one of said reflective elements located on each shoulder area of the tire 180° from the corresponding reflective element in the opposite shoulder of the tire, said two elements each define a peak of a sine wave having a length equal to the circumference of said tire, and a plurality of reflective elements located on the tire periphery on said sine wave, defined by said peak elements and said tire circumference, intermediate said peak elements so that said tire gives a sine wave type optical response with the frequency of said sine wave dependent upon the rate of tire rotation.

2. A pneumatic tire having a plurality of circumferentially discontinuous light reflective elements located on the periphery thereof to reflect light in a direction perpendicular to the axis of rotation of said tire, said elements located in at least two separate axial planes, each said plane containing at least one said element with said elements spaced equal distant from each adjacent element within its plane, the amount of said elements varying from at least one of said planes to another so that at least two of said planes yield a different optical response at pre-selected rotational speeds of said tire.

3. The tire of claim 2 wherein said planes are the circumferential tread grooves in the tread design of said tire.

4. The tire of claim 3 wherein said tire has at least 4 said tread grooves with one of said groove containing 3 said elements, another of said grooves containing 6 of said elements, another of said grooves containing 12 of said elements and another of said grooves containing 24 of said elements.

5. The tire of claim 2 wherein each said plane contains a different number of said elements in relation to all other said planes.

* * * * *